US006988510B2

(12) United States Patent
Enerson

(10) Patent No.: US 6,988,510 B2
(45) Date of Patent: Jan. 24, 2006

(54) DISC CHECK VALVE

(75) Inventor: Jon R. Enerson, Port Richey, FL (US)

(73) Assignee: Halkey-Roberts Corporation, St. Petersburg, FL (US)

(*) Notice: Subject to any disclaimer, the term of this patent is extended or adjusted under 35 U.S.C. 154(b) by 133 days.

(21) Appl. No.: 10/367,460

(22) Filed: Feb. 14, 2003

(65) Prior Publication Data
US 2005/0257838 A1 Nov. 24, 2005

Related U.S. Application Data

(60) Provisional application No. 60/366,590, filed on Mar. 22, 2002.

(51) Int. Cl.
F16K 15/02 (2006.01)

(52) U.S. Cl. .................. 137/533.31; 137/375; 137/515; 137/515.5; 137/559; 251/368

(58) Field of Classification Search ........... 137/533.19, 137/533.21, 533.31, 375, 559, 543.19, 515, 137/515.5; 251/368; 604/247
See application file for complete search history.

(56) References Cited

U.S. PATENT DOCUMENTS

| 455,913 | A | * | 7/1891 | Walker | 137/533.21 |
|---|---|---|---|---|---|
| 1,180,989 | A | * | 4/1916 | Enger | 137/533.19 |
| 2,021,351 | A | | 11/1935 | Carson | 251/128 |
| 2,538,662 | A | | 1/1951 | Abbott | 128/214 |
| 2,710,023 | A | * | 6/1955 | Blackford et al. | 137/543.19 |
| 2,797,704 | A | * | 7/1957 | McDermott et al. | 137/543.19 |
| 2,800,142 | A | * | 7/1957 | Champion | 137/543.19 |
| 2,949,930 | A | | 8/1960 | Moore | 137/516.29 |
| 3,010,477 | A | | 11/1961 | Graham | 137/516.25 |
| 3,601,152 | A | | 8/1971 | Kenworthy | 137/525 |
| 4,310,017 | A | | 1/1982 | Raines | 137/53 |
| 4,369,808 | A | | 1/1983 | Hagman | 137/515.5 |
| 4,415,003 | A | | 11/1983 | Paradis et al. | 137/843 |
| 4,468,224 | A | | 8/1984 | Enzmann et al. | 604/247 |
| 4,850,393 | A | | 7/1989 | Lashomb | 137/528 |
| 5,284,475 | A | | 2/1994 | Mackal | 604/247 |
| 5,474,541 | A | | 12/1995 | Ritsky et al. | 604/213 |
| 5,535,785 | A | * | 7/1996 | Werge et al. | 137/843 |
| 5,692,539 | A | * | 12/1997 | Pickl, Jr. | 137/543.19 |

(Continued)

FOREIGN PATENT DOCUMENTS

EP     472088     8/1991

(Continued)

OTHER PUBLICATIONS

International Search Report, International Application No. PCT/US03/07394, Published by the International Searching Authority.

*Primary Examiner*—John Rivell
(74) *Attorney, Agent, or Firm*—Holland & Knight LLP

(57) ABSTRACT

A free floating disc check valve is provided by the present application. The check valve includes a seal disc having an integral truncated torroidal shaped portion. The torroidal shaped portion provides structural rigidity to the seal disc to minimize deflection of the disc under higher differential fluid pressures. The torroidal shaped portion of the disc cooperates with finger-shaped projections inside the valve body to limit lateral displacement of the disc relative to the axial flow of the fluid. The torroidal shaped portion and the flat portion of the disc form a cup shape that creates a hydrodynamic force that assists in moving the disc to an opened or closed position. The seal disc is made of an elastomeric material that is coated with a dry film lubricant.

20 Claims, 7 Drawing Sheets

U.S. PATENT DOCUMENTS

| | | |
|---|---|---|
| 5,992,462 A | 11/1999 | Atkinson et al. ............ 137/854 |
| 6,158,458 A | 12/2000 | Ryan ........................ 137/515.5 |
| 6,240,962 B1 * | 6/2001 | Tai et al. .................... 137/859 |
| 6,305,416 B1 * | 10/2001 | Snel et al. .................. 137/560 |
| 6,311,712 B1 | 11/2001 | Meyer ............................ 137/8 |
| 2002/0002350 A1 | 1/2002 | Larrain et al. |

FOREIGN PATENT DOCUMENTS

| | | |
|---|---|---|
| FR | 550712 | 9/1956 |
| GB | 2045902 | 11/1980 |

* cited by examiner

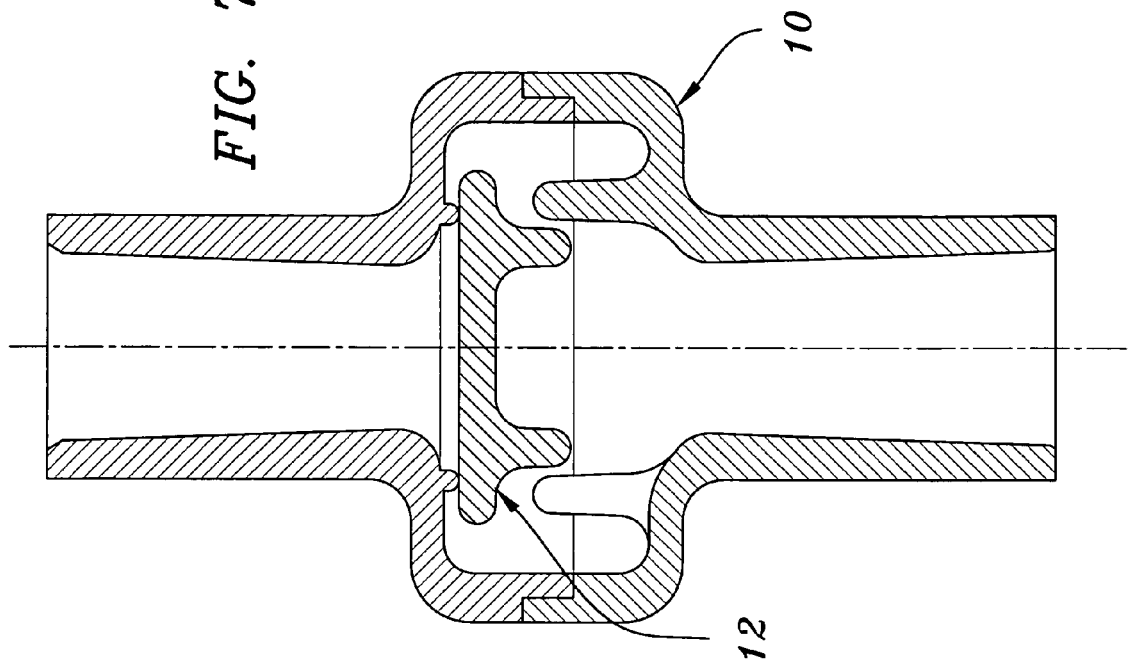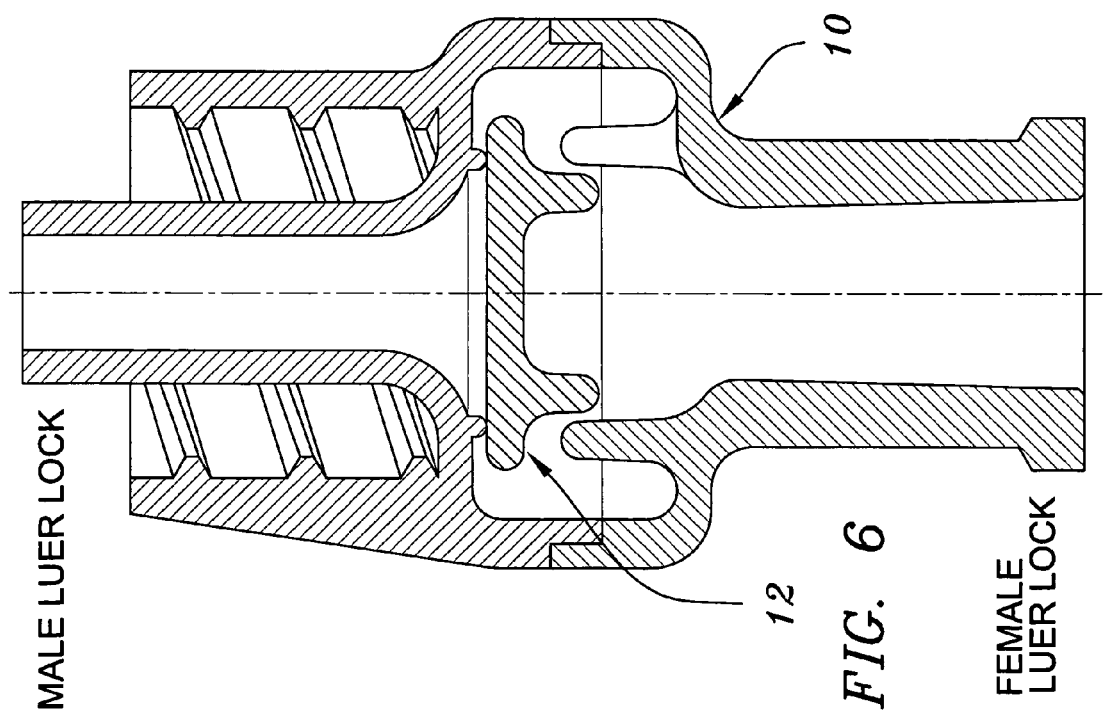

DISC CHECK VALVE

CROSS-REFERENCE TO RELATED APPLICATIONS

This application claims the benefit of provisional application No. 60/366,590, filed Mar. 22, 2002, the disclosure of which is incorporated by reference herein.

BACKGROUND OF THE INVENTION

1. Field of the Invention

This invention relates to check valves. More particularly, this invention relates to check valves for fluids employing a free-floating disc that allows fluid flow in an unchecked direction with a minimal increase in fluid pressure and turbulence while maximizing the rate of fluid flow through the valve.

2. Description of the Background Art

Presently, there exist many types of disc valves that employ a free-floating disc that seats in a checked direction of fluid flow and unseats in an unchecked direction. Optimal designs of disc valves seek to minimize the increase in fluid pressure in the unchecked fluid flow direction, minimize turbulence within the valve and maximize the rate of fluid flow through the valve. It is an object of this invention to provide an improvement that is a significant contribution to the advancement of the disc valve art.

Another object of this invention is to provide a disc valve having a maximum fluid flow rate.

Another object of this invention is to provide a disc valve having a minimal dimensional package size.

Another object of this invention is to provide a disc valve having a minimal tendency of the seal disc to stick in the open or closed position.

Another object of this invention is to provide a disc valve having a minimal seal disc deformation under differential pressure loads.

Another object of this invention is to provide a disc valve having minimal fluid turbulence through the valve.

Another object of this invention is to provide a disc valve having high differential seal pressures.

Another object of this invention is to provide a disc valve having a high ultimate burst pressure.

Another object of this invention is to provide a disc valve having an improved kinematic action of the seal disc.

Another object of this invention is to provide a disc valve composed of modular components to enable various assemblies of end connections.

Another object of this invention is to provide a disc valve having an improved ergonomic design of the valve body/housing.

Another object of this invention is to provide a disc valve having a simplicity of components.

Another object of this invention is to provide a disc valve capable of being consistently and durably manufactured/molded and assembled at a low manufactured cost.

Another object of this invention is to provide a disc valve that is particularly suited for liquid applications, but that may be employed in limited gas media applications.

Another object of this invention is to provide a disc valve that is particularly suited for human blood and blood products applications.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purposes of summarizing this invention, the invention comprises a free-floating disc type check valve that out-performs similar, competitive valve designs and offers a wide variety of customer desired end connections not readily offered by competitive disc valve manufacturers. The valve was designed specifically for liquid applications, however limited gas media applications are possible with the design. Utilization of the valve for human blood and blood products applications is also intended with this design.

One embodiment of the present invention is directed toward a valve for controlling the flow of a fluid through a fluid passage such that a fluid flow in the fluid passage is permitted in a first direction and restricted in a second direction. The valve includes a valve body having an internal fluid chamber with internal side walls. A valve member is contained in the internal fluid chamber. The valve member is a free floating disc-shaped check valve having a first side with an attached truncated torroidal shaped portion and a relatively flat second side. An array of finger-shaped projections are positioned on the valve body that receive the valve member when fluid is flowing through the valve in the first direction. The finger-shaped projections are positioned a distance away from the internal side walls of the valve body such that the disc-shaped check valve is held in the center portion of the valve body by the finger-shaped projections thereby facilitating fluid flow around the outside edges of the disc-shaped check valve. In addition, the finger-shaped projections are dimensioned to receive the truncated torroidal shaped portion of the disc-shaped check valve such that fluid is allowed to flow between the finger-shaped projections. The valve body consists of an inlet portion and an outlet portion that are designed to sealing couple together to form the valve body. The inlet portion of the valve body has an annular sealing protrusion such that when a fluid attempts to flow in the second direction the annular sealing protrusion and the flat portion of the disc-shaped check valve couple to create a seal against the fluid flow in the second direction. In a preferred embodiment, the valve member is constructed of a single piece of elastomeric material, the inlet portion of the valve body is constructed from a single piece of plastic and the outlet portion of the valve body that includes the finger-shaped projections is constructed from a single piece of plastic. Furthermore, the valve body is preferably constructed from a clear plastic that allows the operation of the valve to be visually monitored.

The above described valve offers a number of improvements over the prior art. First, the finger like projections restrict the movement of the valve member in the valve body and significantly reduce the likelihood that the valve member will become jammed in the open or closed position. In addition, the truncated torroidal structure adds rigidity to the valve member that keeps it from bending or becoming stuck when sealing the valve in response to a fluid flow in the restricted direction through the valve. Finally, the simplistic construction and operation of the valve decreases the costs associated with use of the valve. Thus, the above described embodiment offers a number of improvements in the prior art.

Another embodiment of the present invention is directed toward a valve for preventing fluid from flowing in one direction through a fluid channel. The valve includes a valve member having a sealing side portion and a flow side portion wherein the sealing side portion is substantially flat and the flow side portion is substantially cup-shaped. A valve body contains the valve member. The valve member is constructed from a single piece of elastomeric material coated with a non-stick material that minimizes friction between the valve member and valve body. The valve body has a valve member receiving section that is configured to receive the flow side portion of the valve member when fluid is flowing through the valve such that fluid flows through openings in the valve member receiving section. The valve member receiving section includes a plurality of projections positioned such that an opening exists between each projection and such that the valve member is centered within the valve body when received by the valve member receiving section. Preferably, the plurality of projections are finger-shaped and arranged in an substantially circular configuration. In such an embodiment, the flow side portion of the valve member is then received inside of the substantially circular projection configuration when fluid is flowing through the valve such that the fluid flows around the outside edges of the valve member and between the plurality of projections.

Yet another embodiment of the present invention is directed toward a method of preventing fluid from flowing through a pipe in one direction. The method commences by positioning a valve body in the pipe. Preferably, the valve body is constructed out of a transparent material such that proper operation of the valve can be visually confirmed. A free floating valve member is then enclosed inside of the valve body. The valve member is configured to create a hydrodynamic sealing force on the valve member when fluid attempts to flow through the pipe in the flow-inhibited direction. The valve member is engaged with a flow-through seal member having finger-like projections such that it is centered in the valve body when fluid is flowing through the pipe in the flow allowed direction. The free floating valve member is engaged with a flow-inhibiting seal member when fluid is attempting to flow through the pipe in the flow-inhibited direction.

The above described embodiments improve upon the prior art by using the finger-like projections to center the valve member in the valve body such that the flow rate is maximized and the failure rate due to the valve member becoming stuck is minimized. In addition, configuring the valve member to create a hydrodynamic sealing force helps move the valve member from the open position to the closed position while insuring that it does not become stuck. The use of a transparent construction allows a user to visually inspect the valve to determine if it is properly operating. Thus, the above described method offers a number of advantages over the prior art.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be greatly appreciated by those skilled in the art that the conception and the specific embodiment disclosed may be readily utilized as a basis for modifying or designing other methods for carrying out the same purposes of the present invention. It should also be realized by those skilled in the art that such equivalent methods do not depart from the spirit and scope of the invention as set forth in the appended claims.

BRIEF DESCRIPTION OF THE DRAWINGS

For a more succinct understanding of the nature and objects of the invention, reference should be directed to the following description taken in conjunction with the accompanying drawings in which:

FIG. 6 is a cross-sectional view of the assembled disc valve of the invention with male and female luer lock fittings;

FIG. 7 is a cross-sectional view of the assembled disc valve of the invention with luer fittings;

Similar reference numerals refer to similar parts throughout the several figures.

DETAILED DESCRIPTION OF THE PREFERRED EMBODIMENT

Figure 1:
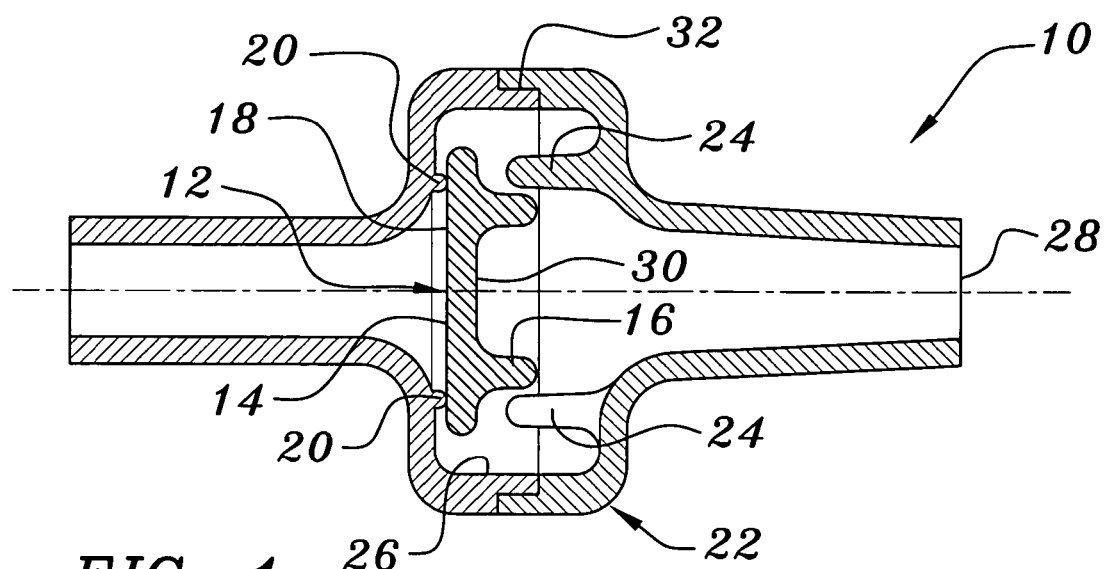
FIG. 1 is a cross-sectional view of the assembled disc valve of the invention.
Figure 2:
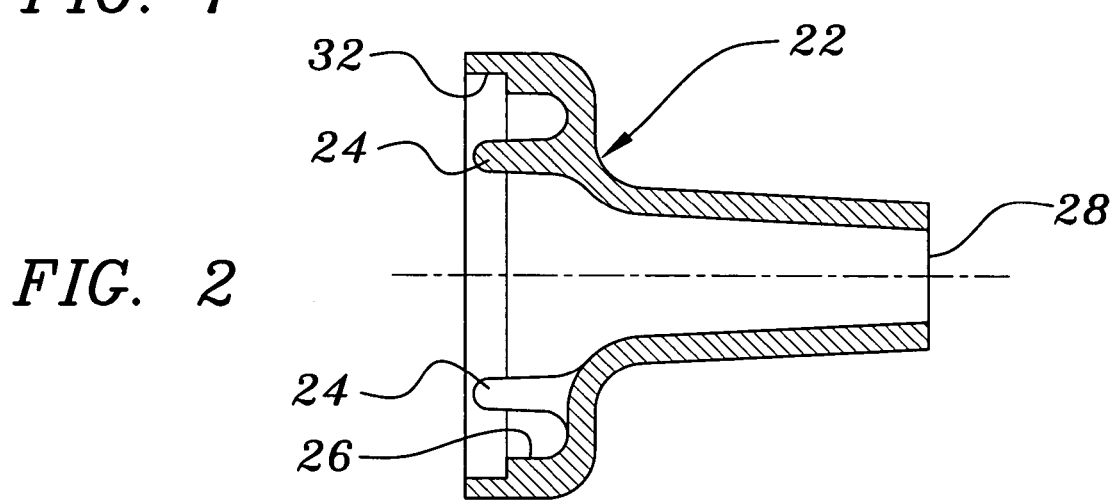
FIG. 2 is a cross-sectional view of the downward flow portion of the disc valve of the invention.
Figure 3:
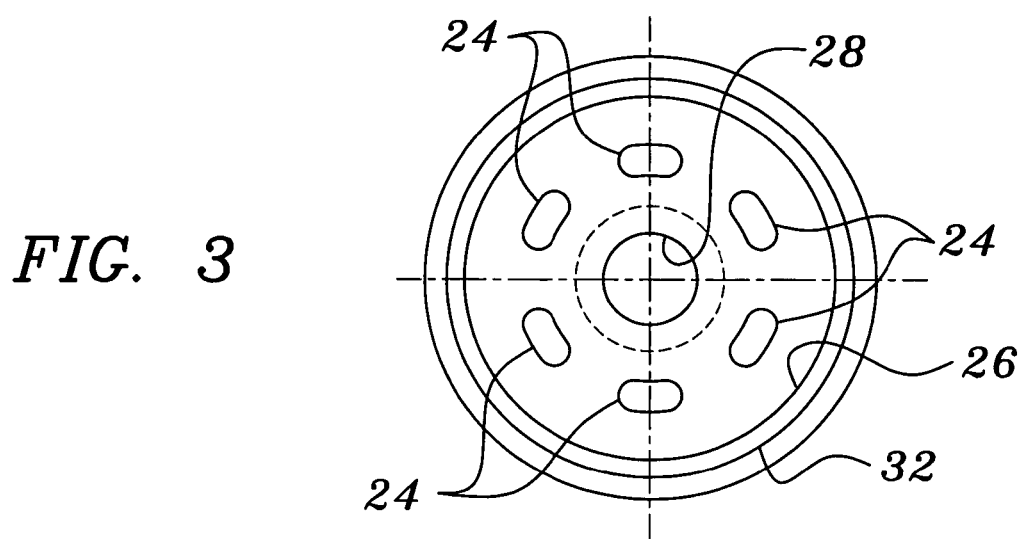
FIG. 3 is an end view of FIG. 2.
Figure 4:
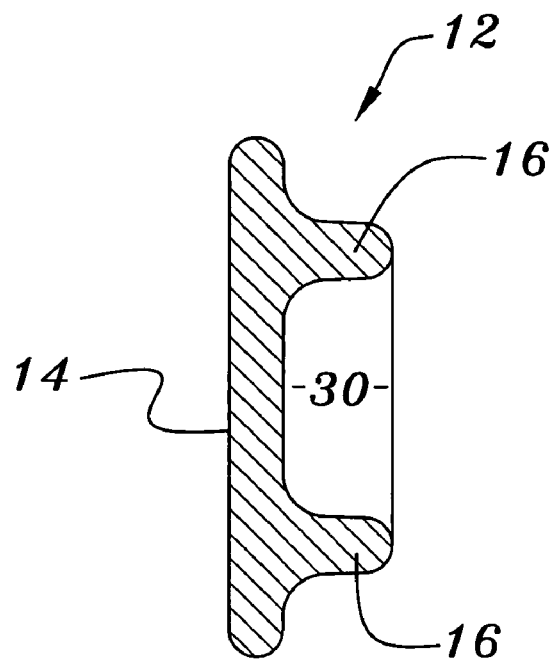
FIG. 4 is a cross-sectional view of the disc of the disc valve of the invention.
Figure 5:
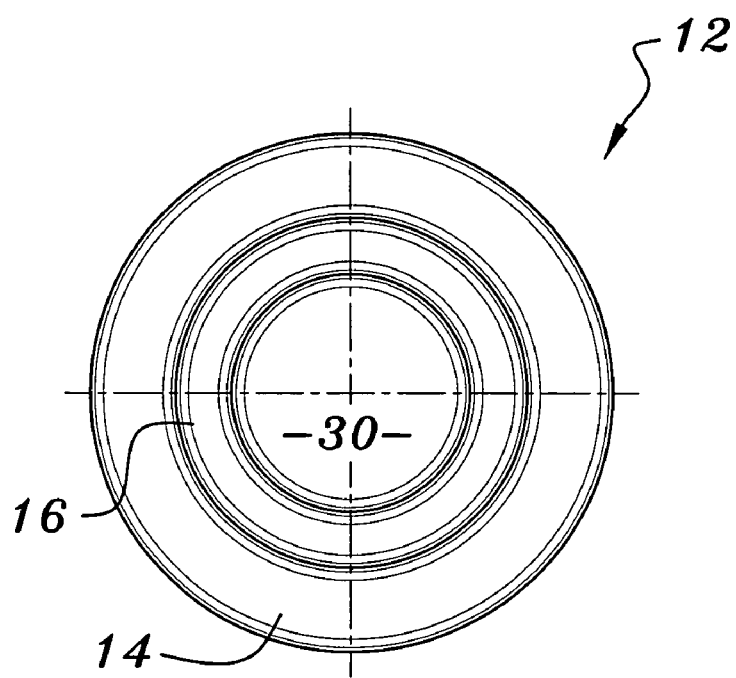
FIG. 5 is an end view of FIG. 4.
Figure 8:
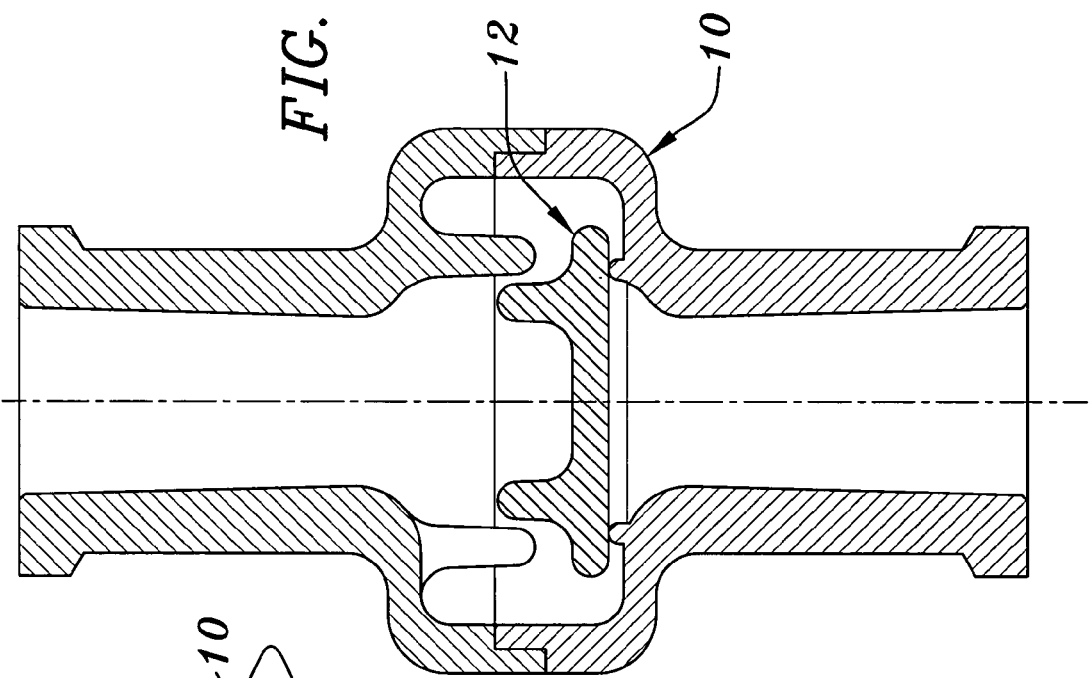
FIG. 8 is a cross-sectional view of the assembled disc valve of the invention with male luer lock fittings.
Figure 9:
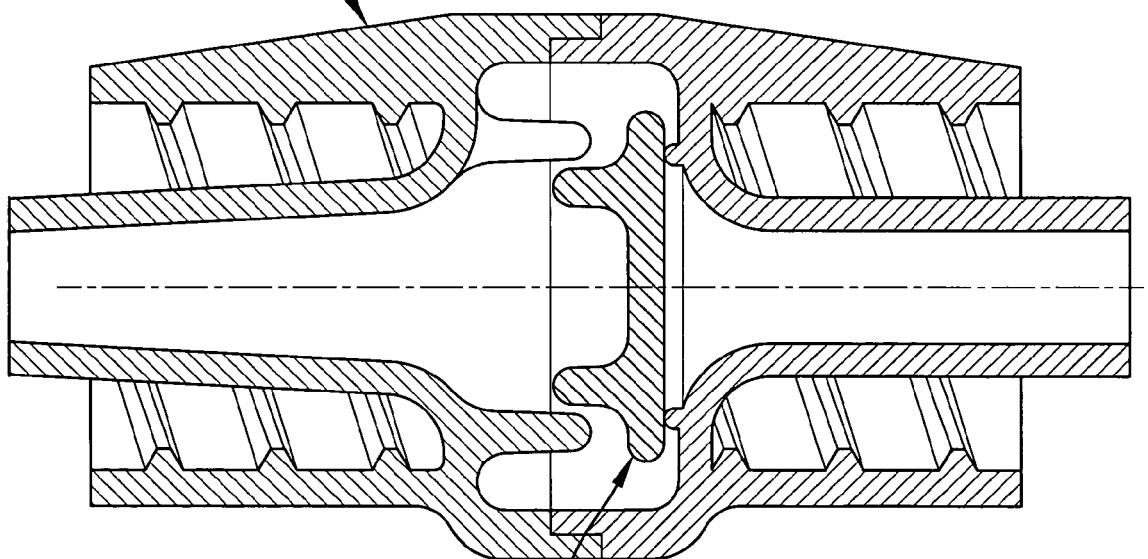
FIG. 9 is a cross-sectional view of the assembled disc valve of the invention with a female luer lock fittings.
Figure 10:
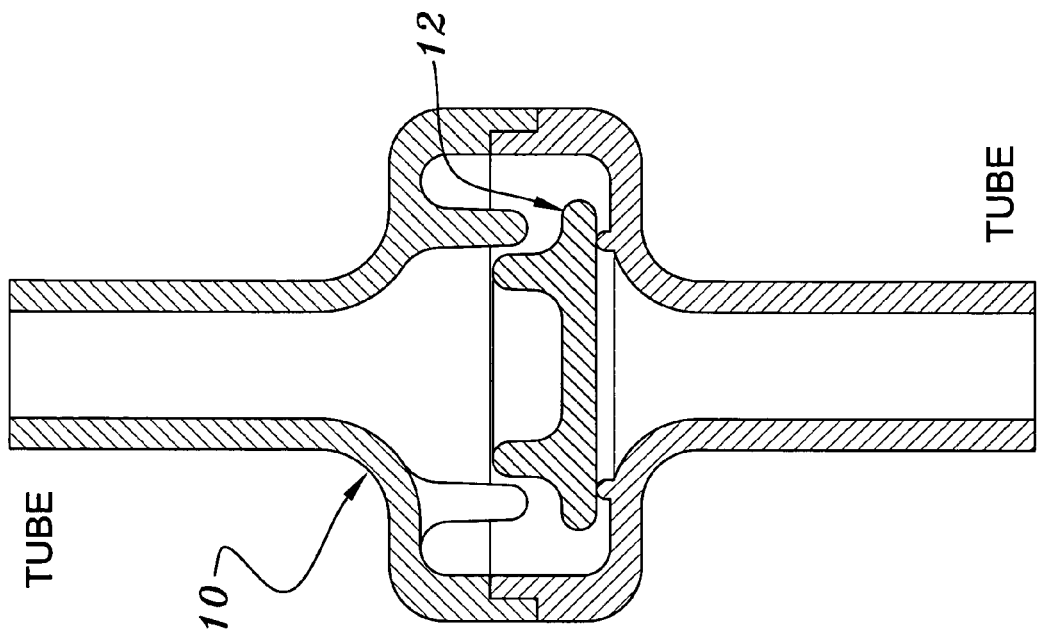
FIG. 10 is a cross-sectional view of the assembled disc valve of the invention with tube and male luer lock fittings.
Figure 11:
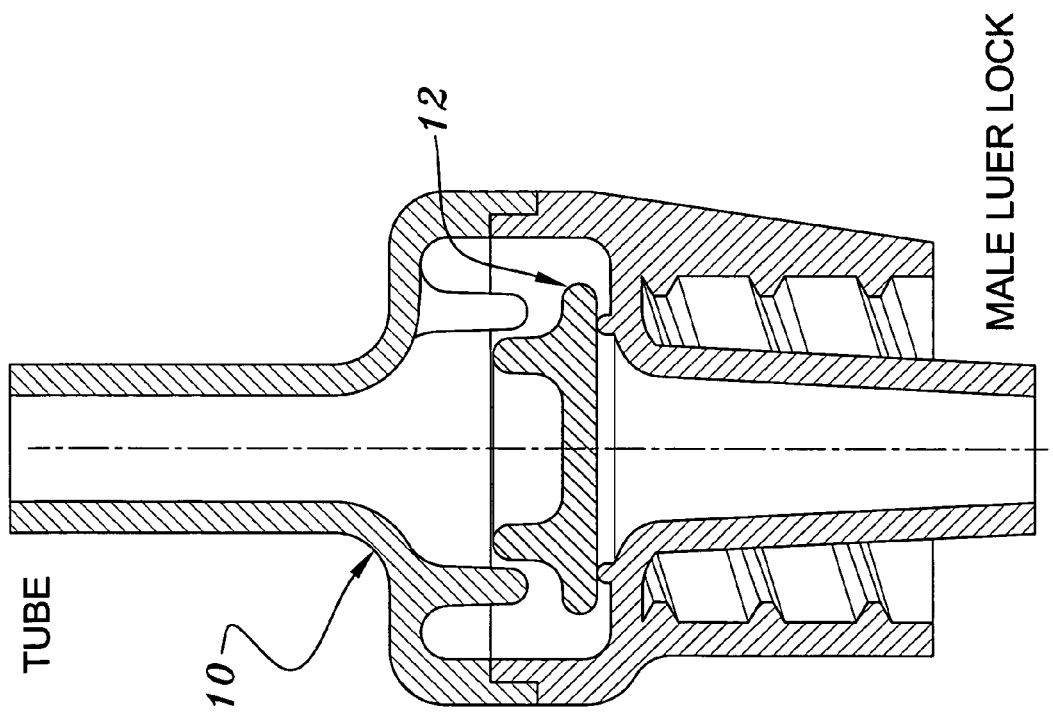
FIGS. 11 and 12 is a cross-sectional view of the assembled disc valve of the invention with tube and male luer lock fittings.
Figure 12:
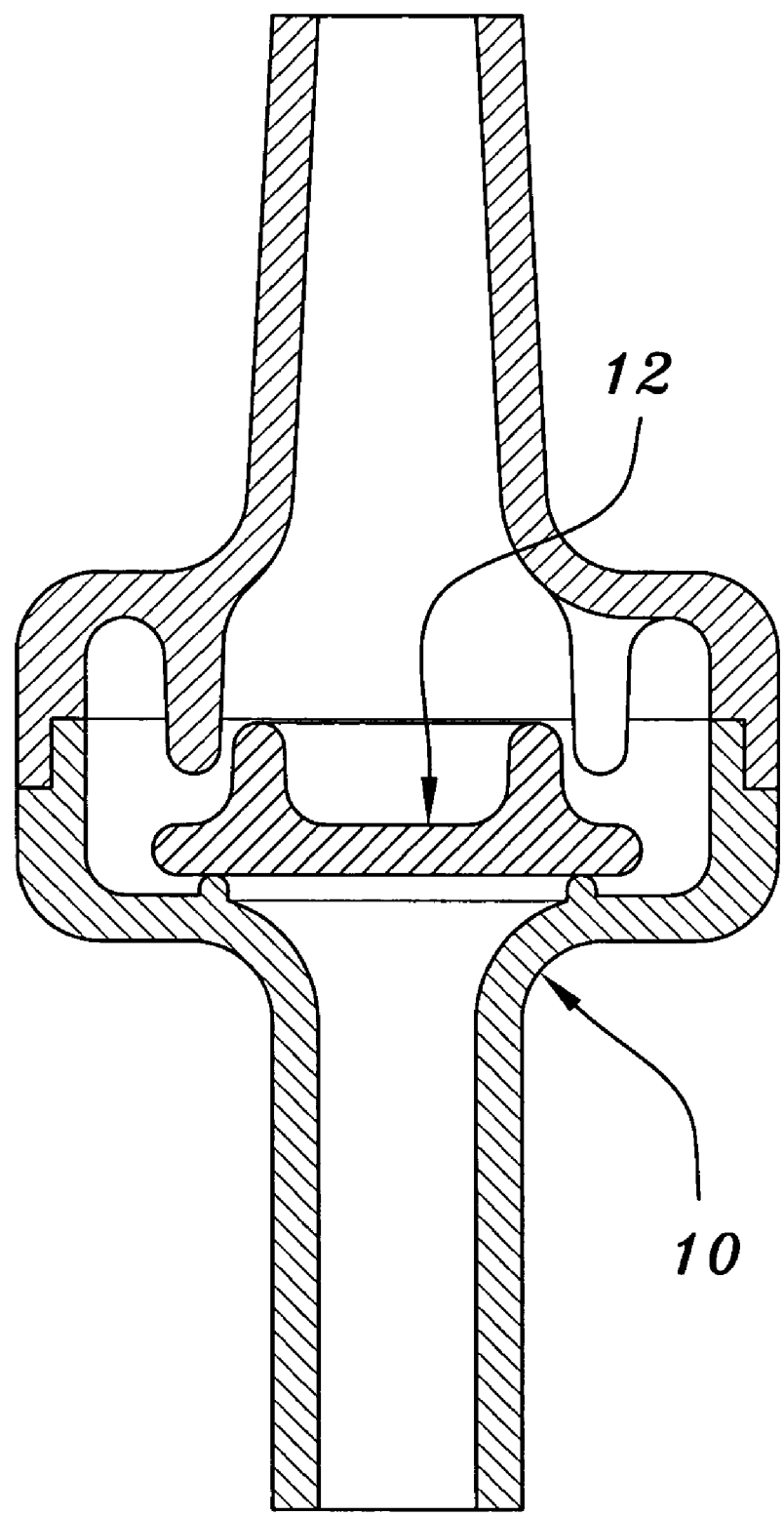

A. Seal Disc Configuration and Function:

As shown in FIGS. 1–5, the new disc check valve utilizes a unique seal disc 12, employing a specific geometry to accomplish multiple specific functions in operation. The configuration of the seal disc 12 may be described as a flat circular disc 14 integrally mated to a modified, truncated torroidal shape 16 projecting from the downward-flow surface of the disc 12. The torroidal shape 16 is the key element of the design of the seal disc 12. This geometry provides the following functional features:

1. The cylindrical mass of the torus 16 on one side of the disc 12 imparts structural rigidity to the seal, helping to keep the seal surface 18 of the disc 12 flat with respect to the annular seal 20 of the valve body 22. The torus 16 shape is positioned so as to have its mass over the annular seal 20. Deflection of the valve seal disc 12, and ultimate leakage or failure, is minimized under higher differential pressures. "Compression set", or permanent deformation of the valve seal disc 12 is mitigated by the structural stiffness added by the torroidal shape 16, and flexural deformation in transition between open and closed positions of the valve seal 12 are minimized. This helps to prevent "sticking" or locking of the valve seal 12 in the open or closed position evidenced in traditional check valves utilizing a common flat disc seal.

2. The torroidal shape 16 is designed to work in conjunction with "fingers" or projections 24 inside the valve body 22. These projections 24 loosely surround the periphery of the torus 16 limiting the lateral displacement of the seal disc 12 in relation to the annular seal 20 of the valve body 22. The projections 24 are designed to permit predetermined axial travel of the valve seal disc 12 to the open position permitting fluid flow through the valve body 22. The specific profile of the periphery of the torus 16 is also designed to allow angular displacement of the seal disc 12 with respect to the centerline axis of the valve assembly 10, while preventing the seal disc 12 from becoming wedged or entrapped in the open position with the "fingers" or projections 24. In this arrangement, the axial displacement of the seal disc 12 and annular clearance between the circumference of the valve seal disc 12 and the annular seal 20 of the valve body 22 is maximized, along with the annular area between the seal disc 12 and the valve body internal wall 26. The outer profile of the torroidal shape 16 also functions cooperatively with the internal valve body shape to direct fluid flow transitionally into the convergent orifice of the valve body outlet 28 when the disc 12 is in the open position, as discussed further in section "Valve Performance, Flow and Pressure".

3. The "cup" shape formed by the modified torus 16, and bounded on one axial end by the flat disc shape, forms a piston 30 that takes advantage of liquid flow moving from the distal toward the proximal end of the valve interior and uses the hydrodynamic force of the liquid to assist in moving the seal disc 12 from the open to the closed position. The velocity of the fluid is higher in proximity to the center axis of the valve assembly 10 as is the fluid pressure, due to the projections 24, or "fingers", surrounding the annular seal 20 directing the larger mass of fluid flow into the "cupped" section 30 of the seal disc 12. This acts to make the valve assembly 10 more quickly responsive to differential pressure to close the valve.

Seal disc 12 may be integrally formed of silicone or polyisoprene or other appropriate elastomeric material. All candidate materials are USP class VI and have notable chemical and biocompatibility properties, as well as structural properties. Elastomeric material hardness offers the optimal balance between structural stiffness and material compression is required to effect a suitable seal in contact with the annular seal 20 of the valve body 22. Fabrication of the polyisoprene material is usually limited to compression molding and, owing to the cost of the material and the manufacturing process, realizes a significantly higher production cost versus the silicone material. The silicone material may be either compression molded or liquid injection molded, (LIM). Production costs and quantities are inversely proportional between compression and liquid injection molding processes, with LIM, offering the higher production quantity with the lower cost per part. Tooling costs for the LIM process are much higher than the compression method however.

Both materials for the valve seal 12 may be coated with Parylene N, which functions as a dry film lubricant. This acts to reduce the breakaway friction, or "stiction" of the valve seal 12 from the valve body annular sealing 20, thereby greatly reducing the valve opening activation force, (pressure), required. The Parylene coating also functions a lubricant to act in conjunction with the outside profile of the torroidal shape 16 of the disc seal 12 in contact with the projections or "fingers" 24 inside the valve body 22. The shape of the disc valve 12, coupled with the Parylene coating insures that the valve seal will be prevented from sticking or mechanically "locking" in the open position. Evaluation of uncoated silicone seal discs, demonstrated that the seal disc adheres to the valve body seat when dry and left static for 24 hours or less. Pressure required to dislodge the seal disc varied from 0.5 PSI to 2.0 PSI. Test valves with uncoated silicone seal discs that were left for 24 hours in the open position also demonstrated that the seal disc adheres to the "fingers" inside the valve body. Although more easily dislodged than seals that were left closed, this effect clearly demonstrates the benefit of the Parylene coating in helping to prevent valve failures and enhancing valve performance.

B. Valve Body Configuration and Function:

The valve body 22 is designed as a two-piece assembly comprising an inlet body half 22I and an outlet body half 22O. Both body halves are joined at a midline, perpendicular to the centerline flow axis of the valve. The joint interface is an overlapping "L" shape 32 that provides for either solvent bonding, or sonic welding of the two valve body components.

Operation of the valve is integral with the interior cavity formed by the two body halves 22 and the seal disc 12. This internal cavity is specifically shaped to allow smooth fluid flow transitions from the inlet to the outlet, and minimize turbulence. Residual volume and collection of residual fluid in the valve interior is reduced via generous radii at flow vector transitions. Development testing of fluid flow through assembled valve bodies both with, and without, the seal disc 12 installed demonstrated a significant improvement of fluid mass flow rate with the seal disc 12 installed. Tested assemblies measured an average of 20-ml/min. higher flow rate with seal discs installed.

This observation assists in supporting the efficacy of the fluid dynamic properties of the valve design. It is theorized that differential fluid flow velocities within the valve cavity, sans seal disc, create an appreciable turbulent zone in proximity to the internal "fingers" or projections on the valve outlet body component. Higher velocity fluid flowing near the longitudinal axis of the valve assembly devoid of the obstruction of the seal disc, meets lower velocity laminar fluid flow conforming to the valve body internal surfaces and flowing between the "finger" projections resulting in turbulence near the convergent section of the valve body outlet.

As shown in FIGS. 6–12, both inlet and outlet valve body components are designed to incorporate five varieties of standard medical type end connections: male slip luer, female slip luer, male luer lock, female luer lock, and/or straight tube connection.

Each of the end connection configurations is interchangeable between inlet and outlet body components, offering 25 different modular combinations of end connections according to customer needs. All iterations of valve bodies retain the same basic center section geometry and volume, differing only in the end connections, and all variations utilize a common valve seal disc.

Series production for various valve body configurations may be accomplished with interchangeable mold tool inserts where practical, thus offering more cost effective flexibility in manufacturing and faster response to various customer requirements. Male luer lock configurations present specific challenges with respect to the internal threads of the design and consequently may not be a candidate for interchangeable tooling, however the balance of the end connection configurations all present themselves as acceptable candidates for the modular tooling concept. Survey of other check valves of this type currently in the market, appears to indicate that the male luer lock end connection is not prevalent at this time. The most prevalent end connection combination currently on the market is a combination of a male slip luer fitting and straight tube fitting.

The valve design is parametrically scalable and the proportion of valve seal and valve body size can be easily scaled to achieve parity with increased end connection sizes. This allows a broad range of customer required sizes, including unique and non-standard end connection configurations. For example, ISO standard medical type end connections currently in popular clinical use may be employed. The assembled size of the valve design is roughly 50% smaller than competitive valves with similar flow rates.

Polycarbonate and PVC, (USP class VI), materials are preferably selected for the valve body components. Tests with polypropylene resulted in excessive material shrinkage sufficient to render the male slip luer dimensional tolerances well below limits, and nonfunctional with standard mating components. While the polypropylene parts were produced on tooling not designed for that material shrinkage, polypropylene material may be a poor candidate material for this design, whereas with polycarbonate and PVC materials yield excellent results in test articles for dimensional stability, material strength, and weld ability.

All materials, (polycarbonate, PVC and polypropylene), exhibit excellent weld characteristics. Further refinement of weld parameters, including through analysis and design of optimal weld tooling are anticipated for series production. Dukane Corporation offers weld tool design analysis and may be consulted as capital assembly equipment is produced. Test weld tooling should be relative to the verified natural vibration frequencies of the product assembly and the weld tool, since a durable and consistent manufacturing process will rely heavily on the critical weld interface integrity of the valve assembly.

Leak and pressure testing of welded valve assemblies demonstrated consistent weld integrity above 60 psig air. No discernable leaks or bubbles were detected in over 200 consecutively welded valves. As gravity feed applications average approximately 3 psi and intravenous pump applications specify 20 psi maximum operating pressure capability, this precluded ultimate burst pressure testing subsequent to determining that the welded assemblies routinely survived over 60 psi in weld integrity tests.

Optimal weld parameters with the test tooling and sample prototype parts on the Dukane welder were determined to be:

Amplifier: 2:1
Weld distance: 0.002 in.
Weld dwell time: 1.0 second
Ram pressure: 30 psig These weld settings yielded acceptable welds with little or no flash or distortion and exhibited consistent weld integrity via pressure testing. Destructive examination of welded assemblies further demonstrated acceptable strength of the weld join.

Series production weld parameters may be based on the above values as a nominal datum.

C. Parylene Coating:

Parylene "N" is selected as a coating for the silicone and polyisoprene substrate seal discs.

The coating serves as dry film lubricant to ensure smooth consistent valve operation, prevent sticking of the seal disc in the open or closed position and maintain opening, (crack), pressure of the valve as low as possible.

Parylene is recognized as a USP Class VI polymer and is gaining wide use and acceptance in medical components and devices. Generically known as parylene, the material called "Parylene N" is polyparaxylylene, a linear crystalline material. The coating is applied to the substrate by means of vapor deposition process in a vacuum chamber. Depending on processed load quantities, the Parylene coating adds an average estimated cost of $0.003 per coated component to the manufactured cost. The benefit of improved competitive performance makes

What is claimed is:

1. A valve for controlling the flow of a fluid through a fluid passage such that a fluid flow in the fluid passage is permitted in a first direction and restricted in a second direction, said valve comprising:
    a valve body having an internal fluid chamber with internal side walls;
    a valve member contained in the internal fluid chamber, said valve member comprising a disc-shaped check valve having a first diameter, said disc-shaped check valve comprising a first side and a second side, said first side including a truncated torroidal shaped portion having a second outer diameter and a first length, said second outer diameter being appreciably less than said first diameter; and
    an array of finger-shaped projections having a base portion connected to the valve body and a finger-tip portion for centering the valve member when fluid is flowing through the valve in the first direction and when restricted in the second direction, said finger-shaped projections including a second length appreciably greater than said first length such that when said truncated torroidal shaped portion moves in said first direction said finger-shaped projections receive said truncated torroidal shaped portion of said disc-shaped check valve and fluid is allowed to flow between said finger-shaped projections and then over said truncated torroidal shaped portion.

2. The valve of claim 1 wherein said disc-shaped check valve has a relatively flat second side.

3. The valve of claim 2 wherein an inlet portion of the valve body further comprises an annular sealing protrusion such that when a fluid attempts to flow in the second direction the annular sealing protrusion and the flat portion of the disc-shaped check valve couple to create a seal against the fluid flow in the second direction.

4. The valve of claim 1 wherein the valve body further comprises an inlet portion and an outlet portion designed to sealing couple together to form the valve body and wherein the finger-shaped projections are positioned on the outlet portion such that the valve member is held in the center of the valve body when the valve member is received by the finger-shaped projections.

5. The valve of claim 4 wherein the valve member is constructed of a single piece of elastomeric material, the inlet portion of the valve body is constructed from a single piece of plastic and the outlet portion of the valve body that includes the finger-shaped projections is constructed from a single piece of plastic.

6. The valve of claim 1 wherein the valve body is constructed from a clear plastic that allows the operation of the valve to be visually monitored.

7. The valve of claim 1 wherein the valve member is a free floating disc check valve.

8. A valve for preventing fluid from flowing in one direction through a fluid channel, said valve comprising:
 a free-floating valve member having a sealing side portion and a flow side portion wherein the sealing side portion is substantially flat and the flow side portion is substantially cup-shaped, said valve member having a first diameter, said cup-shaped flow side portion having a second outer diameter and a first length, said second outer diameter being appreciably less than said first diameter; and
 a valve body for containing the valve member wherein the valve body has a valve member receiving section having a second length appreciably greater than said first length of said cup-shaped portion that is configured, when fluid flow is in an opposite direction, to receive and center said cup-shaped portion of the flow side portion of the valve member when fluid is flowing through the valve such that fluid flows over said cup-shaped portion through openings in the valve member receiving section and, when fluid is prevented from flowing in the one direction, to center said cup-shaped portion of the flow side portion of the valve member.

9. The valve of claim 8 wherein the valve member receiving section further comprises a plurality of projections positioned such that an opening exists between each projection and such that the valve member is centered within the valve body when received by the valve member receiving section.

10. The valve of claim 9 wherein the plurality of projections are finger-shaped.

11. The valve of claim 9 wherein the plurality of projections are arranged in an substantially circular configuration.

12. The valve of claim 11 wherein the flow side portion of the valve member is received inside of the substantially circular projection configuration when fluid is flowing through the valve such that the fluid flows around the outside edges of the valve member and between the plurality of projections.

13. The valve of claim 8 wherein the valve body is constructed from only two pieces of molded plastic.

14. The valve of claim 8 wherein the valve member is constructed from a single piece of elastomeric material coated with a non-stick material that minimizes friction between the valve member and valve body.

15. The valve of claim 14 wherein the coating material is Parylene.

16. A method of preventing fluid from flowing through a pipe in one direction, said method comprising:
 positioning a valve body in the pipe;
 enclosing a free floating valve member having a first diameter inside of the valve body, one side of said valve member further including a protruding portion having a second outer diameter and a first length, said second outer diameter being appreciably less than said first diameter;
 centering the valve member with a flow-through seal member having finger-like projections by a finger-tip portion thereof having a second length appreciably greater than said first length of said protruding portion such that when fluid is flowing through the pipe in a flow allowed direction said protruding portion is centered and received within said finger-tip portion and fluid is allowed to flow through said finger-like projections and then over said protruding portion and when fluid is prevented from flowing through the pipe, said protruding portion is centered by said finger-tip portion.

17. The method of claim 16 further comprising the step of constructing the valve body out of a transparent material such that proper operation of the valve can be visually confirmed.

18. The method of claim 16 further comprising the step of configuring the valve member such that a hydrodynamic sealing force is created on the valve member when fluid attempts to flow through the pipe in the flow-inhibited direction.

19. The method of claim 16 further comprising the steps of constructing the valve body from two pieces of molded plastic and constructing the valve member out of a single piece of elastomeric material.

20. The method of claim 16 wherein the step of engaging the valve member further comprises engaging the valve member such that it is centered in the valve body.

* * * * *

UNITED STATES PATENT AND TRADEMARK OFFICE
CERTIFICATE OF CORRECTION

| | | |
|---|---|---|
| PATENT NO. | : 6,988,510 B2 | Page 1 of 2 |
| APPLICATION NO. | : 10/367460 | |
| DATED | : January 24, 2006 | |
| INVENTOR(S) | : Jon R. Enerson | |

Figure 13:
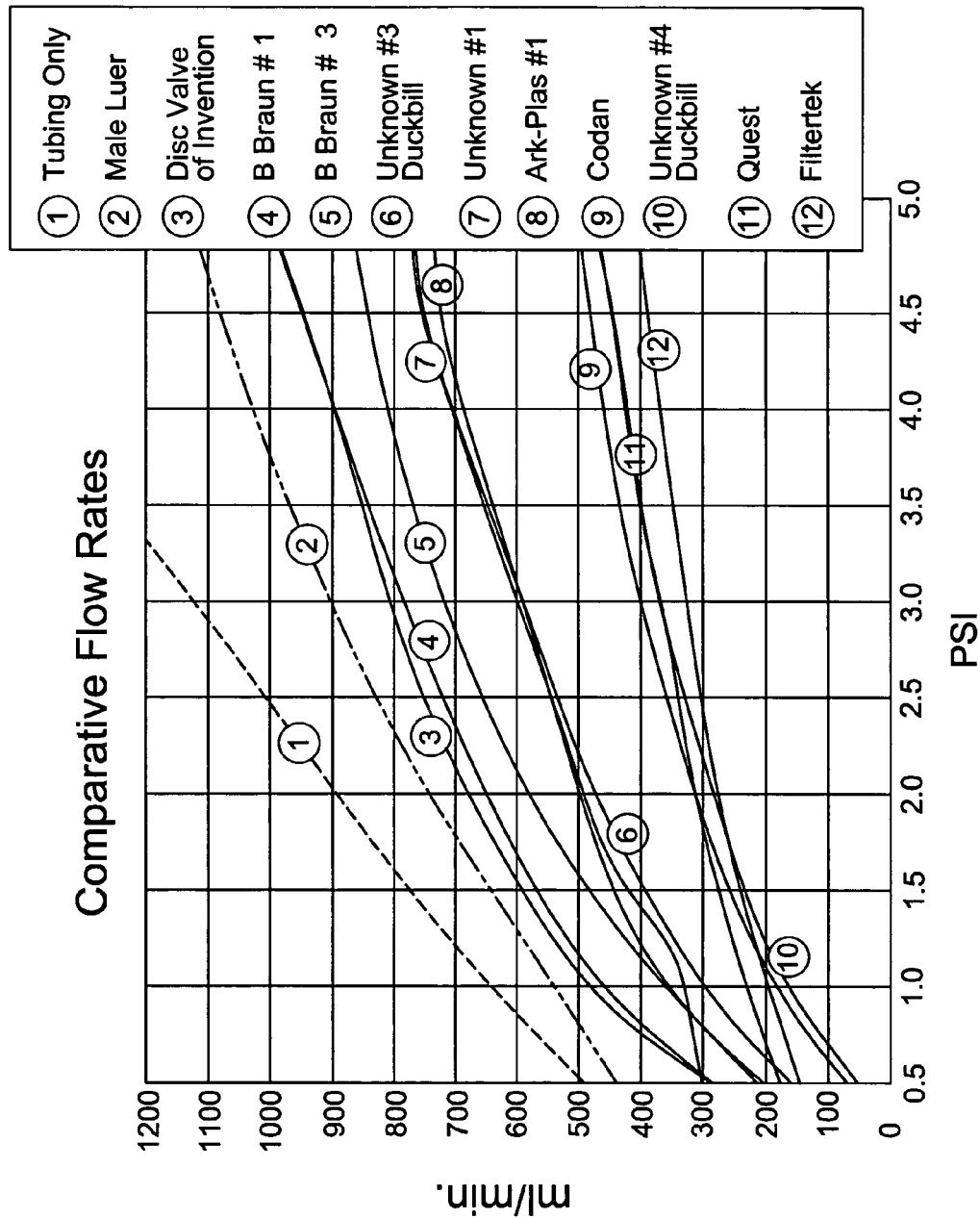
FIG. 13 is a diagram showing the flow rates of the disc valve of the invention as compared to several prior art disc valves.

It is certified that error appears in the above-identified patent and that said Letters Patent is hereby corrected as shown below:

Column 8, line 12 after "makes", please insert:
--Parylene an attractive material. Specialized process equipment is required to coat Parylene.
D. Valve Performance Flow and Pressure:

As shown in Fig. 13; valve test assemblies were subjected to flow testing with unfiltered water at appoximately 70 degrees Fahrenheit to determine fluid mass flow capabilities at approximately 1.0 centipoise viscosity.

Various valves of similar types, (non-return, or check valve), were also flow tested as comparison to validate the design objective of the disc valve of the invention. As is shown in the comparative flow chart, the valve design exhibited superior mass flow capability to all valves tested thus far. With the exception of the Codan valve, all other valves tested are approximately 100% larger in physical size than the tested embodiment of the invention's design. The stated design goal of the highest possible flow in the smallest possible valve assembly package is demonstrated via this comparative analysis.

For the purpose of this comparative flow test, only valves with similar end connection sizes were tested. In the instance of the comparative flow charted, the valve body configuration of the embodiment of the invention consisted of a standard 4-millimeter straight tube connection on the inlet, and a standard ISO male slip luer connection on the outlet. When larger end connection fitting configurations of the valve body components are available, additional comparative flow testing should be undertaken against comparably sized valves from other manufacturers. Observations of competitive valves indicate, however that they rely upon larger end connection fittings with little or no change in their basic valve cavity and seal design size. Competitive valves generally rely on increased annular diameter to achieve "parity" with their valve assembly's inlet and outlet cross-sectional area to render the maximum possible fluid flow through the valve. This of course results in an increased physical size of the assembled valve package, as this design approach generally relies on the internal wall of the valve body to maintain the lateral location of the seal. These valve designs also tend to rely on a traditional flat, thin elastomeric disc to provide their seal. While these discs are inexpensive and relatively simple, they often suffer from compression set, or deformation, under higher differential loads, and are occasionally prone to becoming misaligned and stuck in an open position.

The valve design closest in flow capability to the design of the present invention, (B. Braun #1), utilized a "fixed" flat disc that is impinged at its center point, allowing the disc to deflect from flat to a progressively sharper conical shape under differential pressure. The valve design of the present invention relies on maintaining the annulus formed by the periphery of the valve seal disc and internal wall of the valve body equal to, or greater than, the cross-sectional area of the inlet and outlet ports of th valve. Additionally, the annular area formed between the face of the valve seal and the valve body seal interface in the open position are maintained equal to, or greater than, the valve inlet and outlet individual cross-sectional area of the fluid path.

UNITED STATES PATENT AND TRADEMARK OFFICE
CERTIFICATE OF CORRECTION

PATENT NO. : 6,988,510 B2
APPLICATION NO. : 10/367460
DATED : January 24, 2006
INVENTOR(S) : Jon R. Enerson It is certified that error appears in the above-identified patent and that said Letters Patent is hereby corrected as shown below:

The interstitial space between the projections, or "fingers" in the valve assembly interior are similarly arranged to cumulatively provide fluid path area equal to, or greater than, the inlet or outlet. The shape of the valve body outlet component internal wall forms a convergent orifice, interrupted circumferentially by the projections, ("fingers"), which forms a smooth transition of fluid flow from between the projections and into the valve outlet. When in the open position, the outside profile of the seal disc occludes a portion of the interstitial spaces between the projections. The specific shape of the valve seal disc outer profile, then functions cooperatively with the valve body internal wall shape to form a core shape within the boundary of the projections further streamlining the fluid flow path and minimizing cavitation or turbulence by directing the individual interstitial fluid pathways more directly into the convergent orifice of the valve body outlet. Reverse fluid flow entering the valve from the opposite direction of normal intended flow impacts the cupped portion of the seal disc while also flowing into the interstitial spaces between the "fingers". Fluid pressure and velocity at the center of the valve assembly bounded by the projections is higher than that at the periphery of the internal valve cavity, thus more quickly forcing the valve seal disc to move axially toward the closed position. In this manner the seal disc functions like a piston, taking advantage of fluid dynamics to function more efficiently.
   The present invention includes that contained in the appended claims as well as that of the foregoing description. Although this description has been described in its preferred form with a certain degree of particularity, it should be understood that the present disclosure of the preferred form has been made only by way of example and that numerous changes in the details of construction, combination, or arrangement of parts thereof may be resorted to without departing from the spirit and scope of the invention.--

Signed and Sealed this

Twelfth Day of September, 2006

JON W. DUDAS
*Director of the United States Patent and Trademark Office*